US012687228B2

(12) United States Patent
Kamiya et al.

(10) Patent No.: US 12,687,228 B2
(45) Date of Patent: Jul. 21, 2026

(54) SEALING DEVICE

(71) Applicant: NOK CORPORATION, Tokyo (JP)

(72) Inventors: Yusuke Kamiya, Fukushima (JP);
Masayuki Tanida, Fukushima (JP);
Kokichi Hamamoto, Fukushima (JP);
Hiroka Yamada, Fukushima (JP)

(73) Assignee: NOK CORPORATION, Tokyo (JP)

( * ) Notice: Subject to any disclaimer, the term of this
patent is extended or adjusted under 35
U.S.C. 154(b) by 9 days.

(21) Appl. No.: 18/730,953

(22) PCT Filed: Feb. 7, 2023

(86) PCT No.: PCT/JP2023/004004
§ 371 (c)(1),
(2) Date: Feb. 10, 2025

(87) PCT Pub. No.: WO2023/162676
PCT Pub. Date: Aug. 31, 2023

(65) Prior Publication Data
US 2025/0198515 A1 Jun. 19, 2025

(30) Foreign Application Priority Data

Feb. 24, 2022 (JP) ................................. 2022-026442

(51) Int. Cl.
*F16J 15/32* (2016.01)
*F16J 15/16* (2006.01)
(Continued)
(52) U.S. Cl.
CPC ......... *F16J 15/3232* (2013.01); *F16J 15/162*
(2013.01); *F16J 15/3212* (2013.01); *F16J
15/3284* (2013.01)

(58) Field of Classification Search
CPC .. F16J 15/3232; F16J 15/3212; F16J 15/3284;
F16J 15/3204; F16J 15/3248; F16J
15/3244; F16J 15/162
See application file for complete search history.

(56) References Cited

U.S. PATENT DOCUMENTS 4,484,752 A 11/1984 Bentley
5,195,757 A 3/1993 Dahll
(Continued)

FOREIGN PATENT DOCUMENTS

EP 1 840 426 10/2007
EP 3 293 424 3/2018
(Continued)

OTHER PUBLICATIONS

International Search Report issued in International Patent Applica-
tion No. PCT/JP2023/004004, dated Apr. 4, 2023.
(Continued)

*Primary Examiner* — Christine M Mills
*Assistant Examiner* — L. Susmitha Koneru
(74) *Attorney, Agent, or Firm* — GREENBLUM &
BERNSTEIN, P.L.C.

(57) ABSTRACT

A sealing device is arranged between two relatively dis-
placeable members containing an object to be sealed, for
example, a drive shaft of an electric vehicle, and a housing
for the drive shaft. A sealing body made of conductive
rubber provided in the sealing device is fixed in a state of
contact with the housing by an outer peripheral seal, and
brings a sealing surface provided on a conductive lip into
surface contact with the drive shaft to seal the object. A
grease groove is provided on the sealing surface to retain
grease having conductivity. The grease is filled between the
drive shaft and the sealing surface, and forms a conducting
circuit along with the sealing body which makes the drive
(Continued)

shaft acting as an antenna for electromagnetic noise and the housing conductive.

20 Claims, 8 Drawing Sheets

(51) Int. Cl.
  *F16J 15/3212* (2016.01)
  *F16J 15/3232* (2016.01)
  *F16J 15/3284* (2016.01)

(56) References Cited

U.S. PATENT DOCUMENTS

| | | | | |
|---|---|---|---|---|
| 6,334,618 B1 * | 1/2002 | Ohta | .................... | F16J 15/3244 277/569 |
| 6,726,211 B1 * | 4/2004 | Kuroki | ................. | F16J 15/3244 277/560 |
| 10,228,059 B2 * | 3/2019 | Hyakutake | ........... | F16J 15/3232 |
| 2011/0095486 A1 * | 4/2011 | Nakagawa | ........... | F16J 15/3244 277/549 |
| 2015/0316151 A1 * | 11/2015 | Suzuki | .................. | F16C 33/805 277/562 |
| 2023/0089005 A1 * | 3/2023 | Ito | .......................... | F16J 15/182 277/549 |

FOREIGN PATENT DOCUMENTS

| | | | |
|---|---|---|---|
| EP | 4 191 097 | 6/2023 | |
| EP | 4 443 026 | 10/2024 | |
| GB | 1219272 A * | 1/1971 | ........... F16J 15/3244 |
| JP | 61-501332 | 7/1986 | |
| JP | 3-108932 | 11/1991 | |
| JP | 6-80956 | 11/1994 | |
| JP | 2000-244180 | 9/2000 | |
| JP | 2005-282841 | 10/2005 | |
| JP | 2015-207534 | 11/2015 | |
| JP | 2019-151268 | 9/2019 | |
| JP | 2020-16291 | 1/2020 | |
| WO | 2022/024566 | 2/2022 | |

OTHER PUBLICATIONS

Written Opinion issued in International Patent Application No. PCT/JP2023/004004, dated Apr. 4, 2023.
Extended European search report received in European Patent Application No. 23759680.4, dated Jan. 19, 2026.

* cited by examiner

SEALING DEVICE

TECHNICAL FIELD

The present disclosure relates to a sealing device.

BACKGROUND ART

In electric vehicles (EVs) such as a battery electric vehicle (BEV), a hybrid vehicle (HV), and a fuel cell vehicle (FCV), electromagnetic noise is generated by the on/off operation of an inverter for the control of the current supplied to an electric motor, or by the induced voltage of the electric motor itself, etc. The electromagnetic noise is transmitted to, for example, an axle or the like and is radiated with the axle as an antenna. The electromagnetic noise radiated in this way may cause communication failures in an in-vehicle radio and an in-vehicle wireless device and may cause malfunctions in various electronic devices. Therefore, it is necessary to take countermeasures to eliminate the noise.

Japanese Patent Application Laid-Open No. 2015-207534 (hereinafter referred to as "Patent Document 1") discloses an example of countermeasures against electromagnetic noise, in which various seals (oil seal 23, first dust seal 25 and second dust seal 29) are accommodated in a case 11 which covers an axle (output shaft 10B, drive shaft 31), and a conductive brush 27 is arranged in contact with the drive shaft 31 (refer to paragraph [0021] in Patent Document 1 and FIG. 3). The conductive brush 27 allows leakage current from an electric motor 2B driving the output shaft 10B to flow into the case 11 (refer to paragraphs [0026] and [0027] in Patent Document 1).

Japanese Patent Application Laid-Open No 2000-244180 (hereinafter referred to as "Patent Document 2") discloses an example of countermeasures against electromagnetic noise, in which an oil seal 86 made of conductive rubber which seals a rotating shaft 18 of an electric motor 10 is built into an electric motor housing 14, and the electromagnetic noise induced in the rotating shaft 18 is released to the electric motor housing 14 (refer to paragraph [0027] in Patent Document 2, and FIG. 4).

Japanese Patent Application Laid-Open No. 2019-151268 (hereinafter referred to "Patent Document 3") discloses an example of countermeasures against electromagnetic noise, in which a pair of oil seals (inner oil seal 71, outer oil seal 72) is arranged between left and right axles 3A and 3B and a case 4, a conductive portion 70 having conductivity is provided between the pair of oil seals, and the electromagnetic noise transmitted to the axle is caused to flow to case 4 through the conductive portion 70 (refer to paragraphs [0028] to [0032] in Patent Document 3, and FIGS. 2 and 3). As to the conductive portion 70, it is described that it " . . . has conductive grease 73, and a pair of an outer peripheral side conductive member 74 and an inner peripheral side conductive member 75 provided in the conductive grease 73" (refer to paragraph [0029] in Patent Document 3).

PRIOR ART DOCUMENTS

Patent Documents

Patent Document 1: Japanese Patent Application Laid-Open No. 2015-207534
Patent Document 2: Japanese Patent Application Laid-Open No. 2000-244180

Patent Document 3: Japanese Patent Application Laid-Open No. 2019-151268

SUMMARY

Problem to be Solved

In the case of the configuration example disclosed in Patent Document 1, a dedicated space is required for the conductive brush, thereby leading to an increase in the size of the device. Further, the cost of parts is increased by the increases in the conductive brush itself and its dedicated space.

According to the configuration example disclosed in Patent Document 2, since the oil seal acts as a conductor which allows the electromagnetic noise to escape, there is no need for the dedicated space for the electromagnetic noise countermeasure parts, and a rise in parts costs therefor can be suppressed as well. On the other hand, for example, as in the dust seal (first dust seal 25, second dust seal 29 in Patent Document 1) described in Patent Document 1, when it is used in a place not in direct contact with the fluid to prevent its leakage, the oil seal is easily damaged by sliding friction with the rotating shaft, thereby shortening its lifespan. This point also applies to the configuration example described in Patent Document 1.

In the configuration example disclosed in Patent Document 3, as a result of filling the space between the pair of oil seals with grease, lips (main lips 92b, 95a) facing the grease can reduce sliding friction with the axle. On the other hand, the pair of oil seals is required to contain the grease, thereby resulting in great restriction on layout. Further, as in the configuration example described in Patent Document 1, a dedicated space is required for the storage space for the pair of oil seals and the grease.

As described above, improvements are desired in any configuration example described in Patent Documents 1 to 3, which has been cited as the example of the countermeasures against the electromagnetic noise.

An object of the present disclosure is to obtain a sophisticated sealing device capable of reducing electromagnetic noise derived from an electric motor.

Means for Solving the Problem

One aspect of a sealing device includes a sealing body made of conductive rubber, which is fixed in a state of contact with one of two relatively displaceable members containing an object to be sealed and integrally has an annular conductive lip having a tip brought into contact with the other of the two members to seal the object, a sealing surface provided at the tip of the conductive lip and brought into surface contact with the other member, grease having conductivity, which is filled between the sealing surface and the other member, and a grease groove which is provided in the sealing surface and retains the grease.

Another aspect of a sealing device includes a sealing body made of conductive rubber, which is fixed in a state of contact with one of two relatively displaceable members containing an object to be sealed and integrally has an annular conductive lip having a tip brought into contact with the other of the two members to seal the object, a sealing surface provided at the tip of the conductive lip and brought into surface contact with the other member, and a grease groove provided in the sealing surface and retaining grease having conductivity in advance so that the grease is capable of being filled between the sealing surface and the other member.

A further aspect of a sealing device includes a sealing body made of conductive rubber, which is fixed in a state of contact with one of two relatively displaceable members containing an object to be sealed and integrally has an annular conductive lip having a tip brought into contact with the other of the two members to seal the object, a sealing surface provided at the tip of the conductive lip and brought into surface contact with the other member, and a grease supply portion configured to retain grease having conductivity in advance in a grease groove provided in the sealing surface and to fill the grease between the sealing surface and the other member.

Effect

A sophisticated sealing device is capable of reducing electromagnetic noise derived from an electric motor.

DESCRIPTION OF EMBODIMENTS

Figure 1:
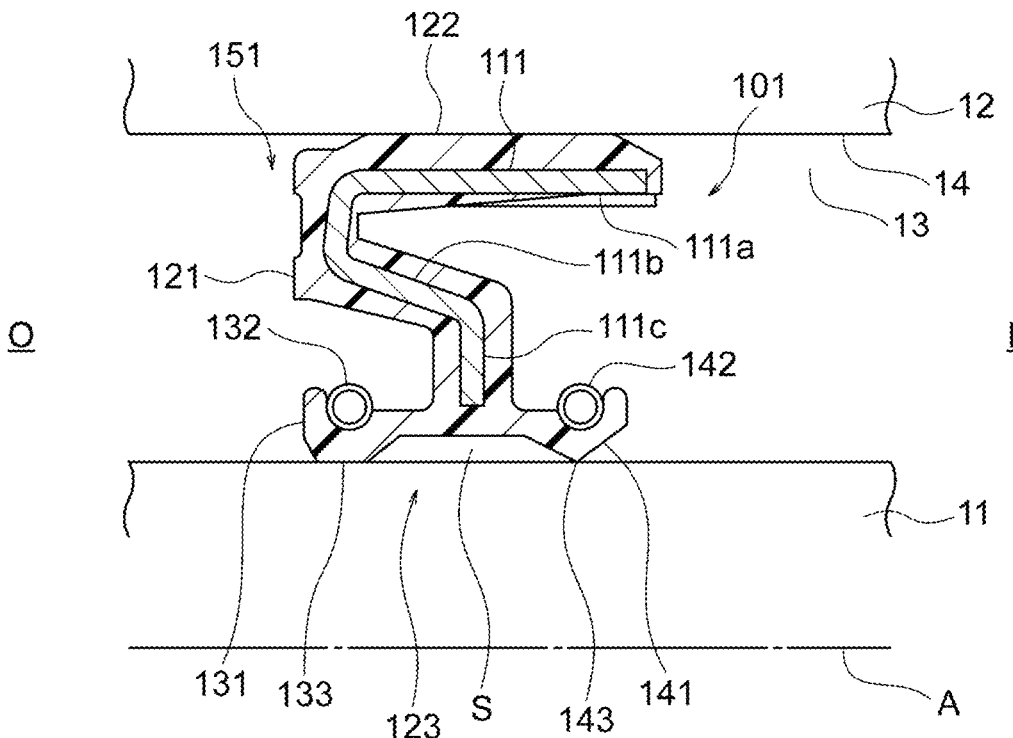
FIG. 1 is a cross-sectional view of a sealing device according to a first embodiment, which is arranged between two members.

Embodiments will be described with reference to the accompanying drawings. Three of first to third embodiments will be introduced along the following items.

[First Embodiment]
  1. Configuration
    (1) Two members in which a sealing device is used
    (2) Overview of sealing device
    (3) Reinforcement ring
    (4) Sealing body
    (5) Conductive lip
      (a) overall structure
      (b) sealing surface
      (c) grease supply portion
    (6) Sealing lip
    (7) Conducting circuit
  2. Actions and effects
    (1) Electromagnetic noise countermeasure
    (2) Lubricating function
    (3) Negative pressure preventing function 3. Another embodiment of fluid return portion
[Second Embodiment]
    1. Configuration
    2. Actions and effects
[Third Embodiment]
    1. Configuration
    2. Actions and effects

First Embodiment

The first embodiment will be described with reference to FIG. 1 to FIGS. 4(A) and 4(B).

1. Configuration

(1) Two Members in Which Sealing Device is Used

A sealing device 101 according to the present embodiment is used in electric vehicles (EV) such as a battery electric vehicle (BEV), a hybrid vehicle (HV), a fuel cell vehicle (FCV), etc. The sealing device 101 is interposed in a gap 13 between two relatively displaceable members, e.g., a drive shaft 11 which rotates with an unillustrated electric motor as a drive source, and a housing 12 therefor to seal an object to be sealed such as lubricating oil or the like stored in the housing 12 to prevent it from leaking. Therefore, the sealing device 101 constitutes a sealing structure which seals the object to be sealed contained in the housing 12. A one-dot chain line in FIG. 1 indicates an axis A passing through the center of the drive shaft 11, which rotates about the axis A.

The housing 12, which is one of the two members, has a shaft hole 14. The shaft hole 14 connects the interior side I and the atmosphere side O of the housing 12. The drive shaft 11, which is the other of the two members, passes through the shaft hole 14 and is exposed from the interior side I to the atmosphere side O.

(2) Overview of Sealing Device

As illustrated in FIG. 1, the sealing device 101 has an annular shape (its overall shape is not illustrated) and is fixedly mounted within the shaft hole 14 provided in the housing 12. The axis of the sealing device 101 is common with the axis A of the drive shaft 11.

A main structure of the sealing device 101 is a sealing body 121 reinforced by a metal reinforcing ring 111. The sealing body 121 is formed of conductive rubber which is crosslinked and bonded to the reinforcing ring 111 to be integrally formed. The sealing body 121 includes an outer peripheral seal 122 which contacts an inner peripheral surface of the shaft hole 14 on the outer peripheral side thereof, and a sealing portion 123 which contacts the drive shaft 11 on the inner peripheral side thereof, respectively. The sealing portion 123 has a conductive lip 131 and a sealing lip 141.

An object to be sealed, e.g., fluid such as lubricating oil (not illustrated) is contained on the interior side I of the housing 12. The sealing device 101 is interposed in the gap 13 between the drive shaft 11 and the housing 12 to seal the fluid contained on the interior side I and prevent the fluid from leaking out to the atmosphere side O.

(3) Reinforcing Ring

The reinforcing ring 111 is an annular metal member having a fixed piece 111*a* extending in parallel along the inner peripheral surface of the shaft hole 14, a bent piece 111*b* bent at right angles from the fixed piece 111*a* and bent back obliquely, and a support piece 111*c* further bent from the bent piece 111*b* and facing toward the drive shaft 11. These fixed piece 111*a*, bent piece 111*b* and support piece 111*c* are formed by pressing an annular metal plate, for example.

An outer peripheral surface of the fixes piece 111*a* is smaller in diameter than the inner peripheral surface of the shaft hole 14. An inner peripheral surface of the support piece 111*c* is larger in diameter than an outer peripheral surface of the drive shaft 11.

(4) Sealing Body

The sealing body 121 is an annular member which entirely covers the reinforcing ring 111 along its shape, and has the outer peripheral seal 122 formed at a portion thereof which covers the outer peripheral side of the fixed piece 111*a*. The outer peripheral seal 122 is slightly larger in diameter than the inner peripheral surface of the shaft hole 14. When the sealing device 101 is installed in the shaft hole 14, the outer peripheral seal 122 is bent, thereby enabling the sealing device 101 to be fixedly attached inside the shaft hole 14.

The sealing body 121 covers the front and back surfaces of the fixed piece 111*a*, the bent piece 111*b*, and the support piece 111*c* of the reinforcing ring 111 and is bifurcated from the tip of the support piece 111*c*. The bifurcated portions respectively extend parallel to the axis A of the drive shaft 11 and form the sealing portion 123. The conductive lip 131 is provided at the end of a portion of the sealing portion 123, which extends toward the atmosphere side O. The sealing lip 141 is provided at the end of a portion thereof which extends toward the interior side I.

Figure 2:
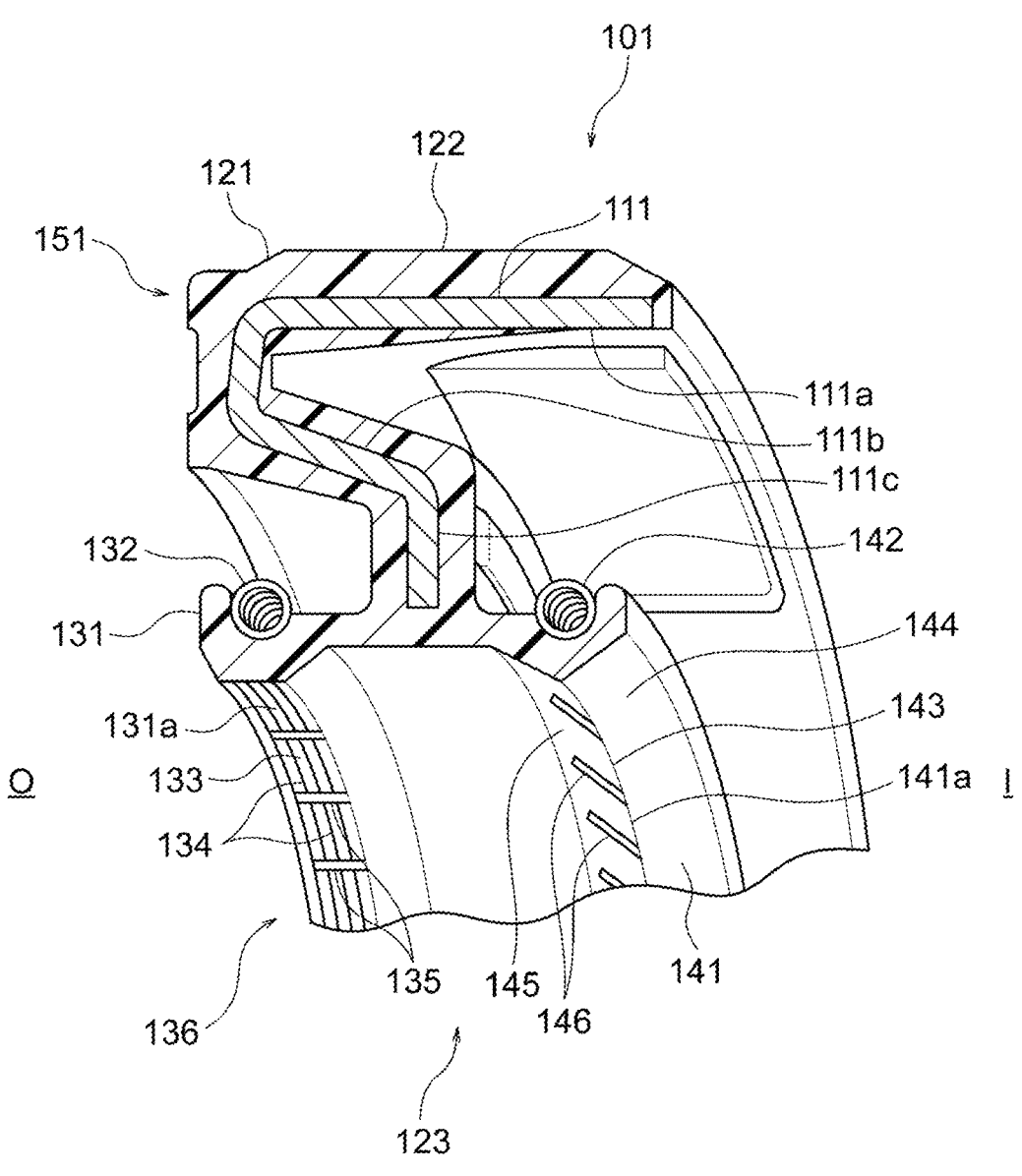
FIG. 2 is a perspective view of the sealing device whose part is partly illustrated in cross section.
Figure 3:
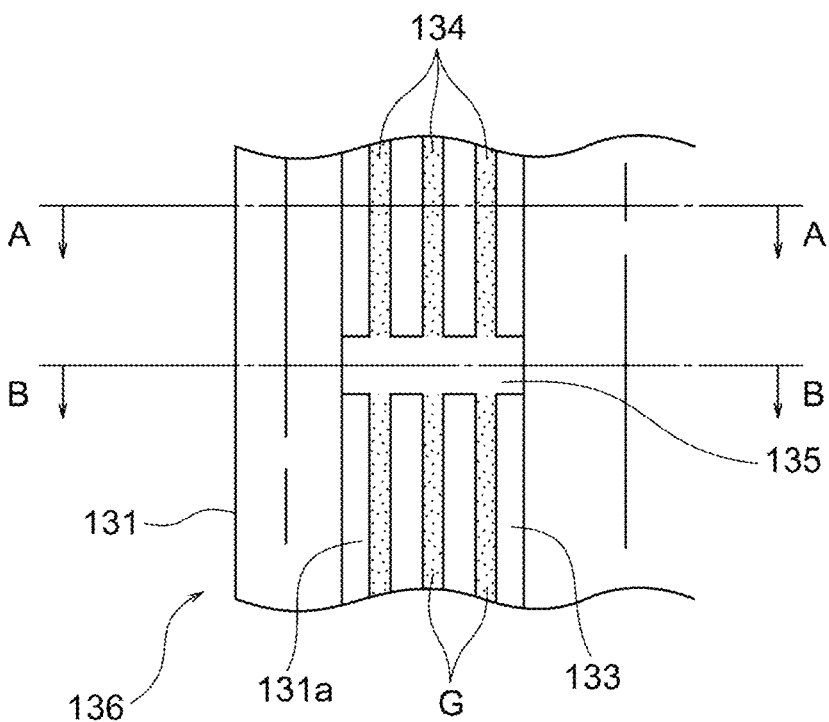
FIG. 3 is an enlarged front view of a sealing surface provided on a conductive lip.

As illustrated in FIGS. 1 and 2, the conductive lip 131 and the sealing lip 141 are arranged to be in contact with the drive shaft 11 to close the gap 13 between the drive shaft 11 and the shaft hole 14. In this case, a garter spring 132 and a garter spring 142 are provided on the rear surface side of the conductive lip 131 and on the rear surface side of the sealing lip 141 so as to surround the sealing portion 123, respectively. These garter springs 132 and 142 increase the fastening forces of the conductive lip 131 and the sealing lip 141 against the drive shaft 11.

(5) Conductive Lip

(a) Overall Structure

As illustrated in FIG. 2, the conductive lip 131 has an annular sealing surface 133 at its tip 131*a*. The sealing surface 133 seals the outer peripheral surface of the drive shaft 11 by surface contact. Due to such a structure, it can be said that the conductive lip 131 is a seal of a type in which the tip 131*a* is pressed against the object (drive shaft 11) to be sealed from the orthogonal direction, instead of a tongue type in which the conductive lip 131 is pressed against the object to be sealed and bent, and uses a predetermined area from the tip toward the root as a sealing surface.

As an example, the sealing surface 133 is a flat surface, and as another example, the sealing surface 133 is a curved surface which expands a contact area with the drive shaft 11 by deforming along the outer peripheral surface of the drive shaft 11. Even it is whatever shape, the sealing surface 133 has an axial length sufficient to obtain surface contact with the outer peripheral surface of the drive shaft 11. The axial length of the sealing surface 133 will be described later.

As illustrated in FIG. 2 to FIGS. 4(A) and 4(B), the sealing surface 133 is provided with a plurality of threads of grease grooves 134 along its circumferential direction. As an example, the number of threads of the grease grooves 134 is three. The number of the threads thereof is not limited to three, and one or two, or four or more grease grooves 134 may be provided on the sealing surface 133.

Figure 4A:
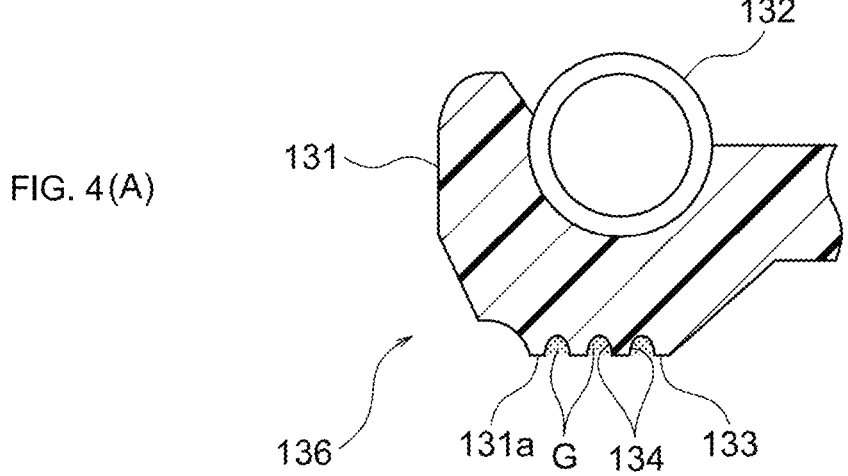
FIG. 4(A) is a cross-sectional view taken along line A-A in FIG. 3.
Figure 4B:
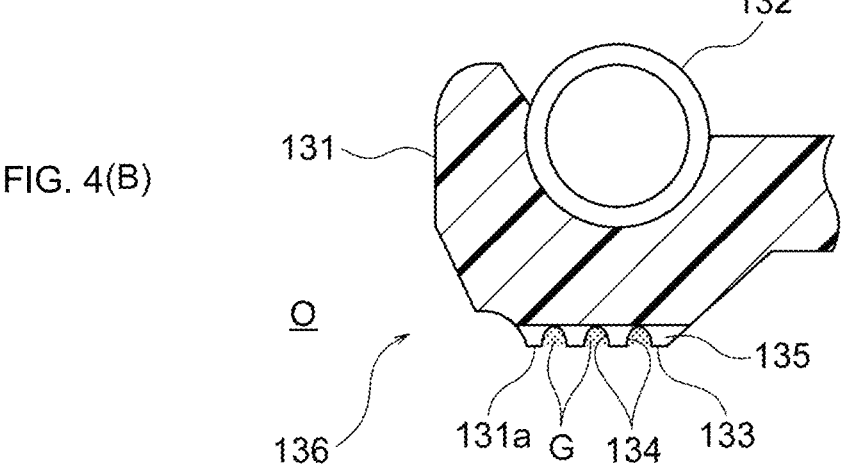
FIG. 4(B) is a cross-sectional view taken along line B-B in FIG. 3.

The grease groove 134 provided on the sealing surface 133 of the conductive lip 131 accommodates and retains grease G therein. The grease G retained in the grease grooves 134 is grease having conductivity. It is desirable that the grease groove 134 has a certain depth in terms of the structure of retaining the grease G. The cross-sectional shape of the grease groove 134 may be any shape as long as it retains the grease G, such as a rectangular shape, and a curved shape in addition to such parabolic shapes as illustrated in FIGS. 4(A) and 4(B), for example.

A plurality of threads of connecting grooves 135 are also provided on the sealing surface 133 of the conductive lip 131. These connecting grooves 135 are provided along the axial direction of the sealing device 101 (coincidence with the direction of the axis A of the drive shaft 11) and connect a space S created between the conductive lip 131 and the sealing lip 141 and a space on the atmosphere side O. Therefore, the connecting groove 135 is provided so as to transverse the grease groove 134 and also connects to the grease groove 134 (refer to FIG. 3 and FIG. 4(B)).

As an example, the grease G is filled only in the grease groove 134 and not filled in the connecting groove 135. Consequently, the grease G stays in the grease groove 134 and is less likely to leak into the connecting groove 135. Although it is possible that the grease G may be carried into the connecting groove 135 by the rotation of the drive shaft 11, it is possible to prevent the connecting groove 135 from being clogged with the grease G by forming the connecting groove 135 to be wide or deep to some extent. As an example, the groove width and depth of the connecting groove 135 are determined from the viewpoint of preventing clogging with the grease G.

As illustrated in FIG. 2, the plurality of threads of connecting grooves 135 are arranged along the circumferential direction of the sealing surface 133 of the conductive lip 131. The arrangement positions of the connecting grooves 135 may or may not be evenly spaced, and the arrangement pitch thereof is not particularly limited either. As will be described later, the connecting groove 135 has the role of suppressing negative pressure in the space S (refer to FIG. 1) created between the conductive lip 131 and the sealing lip 141. As long as such a role is fulfilled, various aspects of the shape, size, arranged number of threads, etc. of the connecting grooves 135 are allowed.

(b) Sealing Surface

As described above, the sealing surface 133 has an axial length sufficient to obtain surface contact with the outer peripheral surface of the drive shaft 11. The surface contact referred to here can be compared with, for example, line contact of the sealing lip 141 with the drive shaft 11, which will be described later. It can be seen that the concepts of "surface contact" and "line contact" are relative by observing the actual contact state with respect to the contact object such as the drive shaft 11. This is because even though it is the line contact, a surface having a certain area contacts the drive shaft 11 when viewed microscopically.

In the present embodiment, the phenomenon described by the term "surface contact" means that the drive shaft 11 is made contact with a surface large enough to provide the grease groove 134 capable of retaining the grease G on the sealing surface 133. The grease G retained in the grease groove 134 is required to be filled between the sealing surface 133 and the drive shaft 11 when the sealing surface 133 contacts the drive shaft 11. The axial length of the sealing surface 133 is determined from this point of view.

Figure 8:
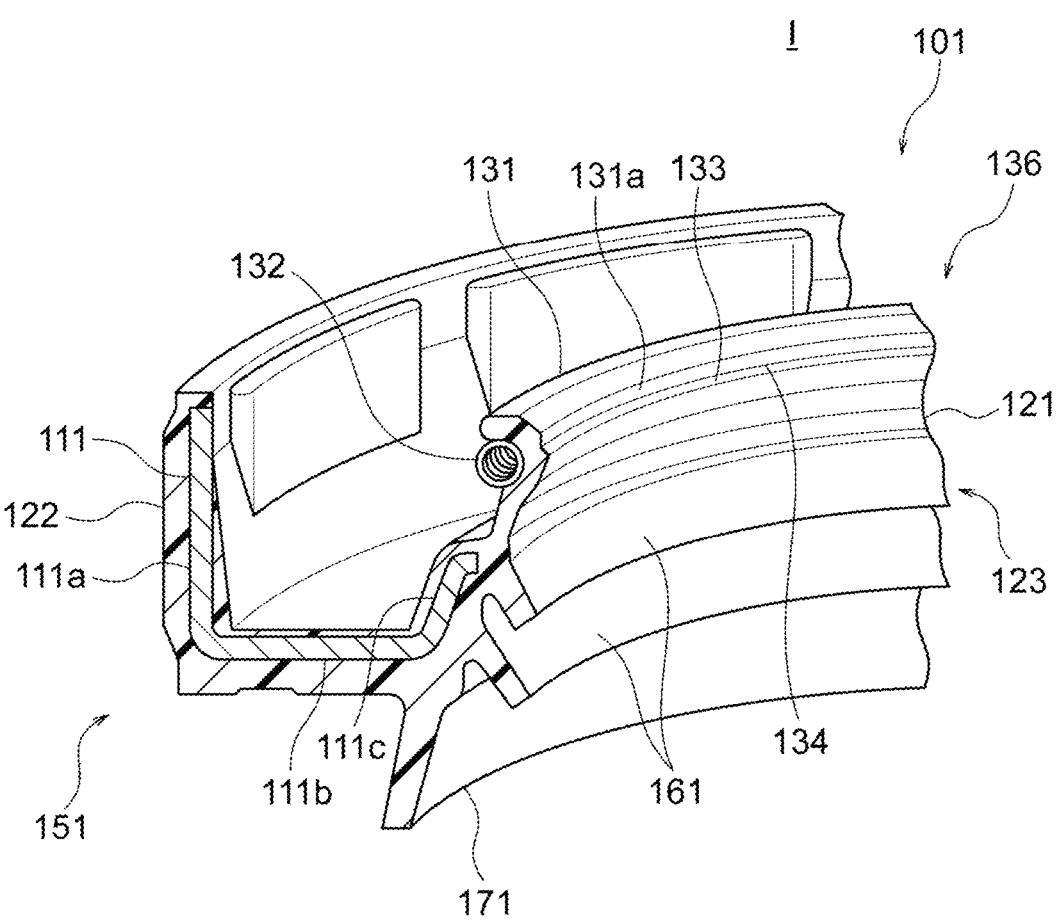
FIG. 8 is a perspective view of a sealing device according to a third embodiment whose part is partially illustrated in cross section.

In the present embodiment, as an example, the axial length of the sealing surface 133 is determined to be a length equal to or longer than the diameter dimension of the garter spring 132 (refer to FIGS. 1 and 2). The axial length of such a sealing surface 133 depends on the groove width, the number of threads, or the shape or the like of the grease grooves 134 arranged in the axial direction. For example, the axial length of the sealing surface 133 may have to be increased if the groove width of the grease groove 134 is wider or if the number of threads becomes larger. Conversely, when the groove width of the grease grooves 134 is made narrower, or when the number of threads thereof becomes smaller, the axial length may be possible to narrow (for example, refer to FIG. 8 illustrating the third embodiment). The axial length of the sealing surface 133 may be as long as or shorter than the diameter of the garter spring 132 as long as the grease groove 134 can be provided.

The axial length of the sealing surface 133, which is slightly larger than the diameter dimension of the garter spring 132 illustrated in FIGS. 1 and 2, is not always determined when the number of threads of the grease grooves 134 is provided three. Even when the three threads of grease grooves 134 are provided, the axial length of the sealing surface 133 varies depending on factors such as the groove width and shape of the grease groove 134, and can also be the same as the diameter of the garter spring 132 or shorter in length than the garter spring 132.

(c) Grease Supply Portion

The sealing device 101 according to the present embodiment uses the grease G as an essential element. That is, the grease groove 134 retains the grease G in advance so that the grease G can be filled between the sealing surface 133 and the drive shaft 11. Therefore, the sealing structure by the sealing device 101 constitutes a grease supply portion 136 which pre-retains the grease G in the grease groove 134 provided in the sealing surface 133 and fills the grease G between the sealing surface 133 and the drive shaft 11.

(6) Sealing Lip

The sealing lip 141 has a triangular cross-section and has an annular lip portion 143 at its tip 141a. The lip portion 143 seals the outer peripheral surface of the drive shaft 11 by line contact. Due to such a structure, the sealing lip 141 is a seal of a type in which the tip 141a is pressed against the object to be sealed (drive shaft 11) from the orthogonal direction, instead of a tongue type in which the sealing lip 141 is bent by contact with the object to be sealed and uses a predetermined area from the tip toward the root as a sealing surface. The difference from the conductive lip 131 resides in that the lip portion 143 contacts the drive shaft 11 not through the surface contact through the sealing surface 133, but through the line contact through the lip portion 143.

The sealing lip 141 has an interior surface 144 closer to the interior side I than the lip portion 143 and an atmospheric surface 145 on the atmosphere side O facing the conductive lip 131. The atmospheric surface 145 is provided with a plurality of threads of thread grooves 146 as a fluid return portion. These thread grooves 146 are grooves which are inclined along the rotational direction of the drive shaft 11 with the lip portion 143 as a starting point. As the drive shaft 11 rotates, the thread groove 146 generates an airflow from the atmospheric surface 145 toward the interior surface 144 and causes a screw pumping action to push back the sealing fluid (not illustrated) leaked to the atmosphere side O beyond the lip portion 143 to the interior side I.

(7) Conducting Circuit

The sealing body 121 of the sealing device 101 is an integral structure made of conductive rubber. For this reason, a conducting circuit 151 (refer to FIG. 1) is formed which extends from the conductive lip 131 and the sealing lip 141 brought into contact with the drive shaft 11 to the housing 12 via the outer peripheral seal 122. The grease G is interposed in the form of a film between the sealing surface 133 of the conductive lip 131 and the outer peripheral surface of the drive shaft 11. Since the grease G also has conductivity, the sealing body 121 constitutes a part of the conducting circuit 151.

2. Actions and Effects

In such a configuration, the sealing portion 123 of the sealing device 101 brings the conductive lip 131 and the sealing lip 141 into contact with the drive shaft 11 to prevent leakage of fluid (object to be sealed) from the interior side I. The sealing lip 141 performs a main sealing function of preventing the leakage of the fluid from the interior side I by the lip portion 143. The conductive lip 131 performs a secondary sealing function of damming the fluid leaked from the sealing lip 141 by the sealing surface 133. The conductive lip 131 also functions as a dust lip which suppresses the intrusion of sludges and foreign matters from the atmosphere side O to the interior side I.

(1) Countermeasure Against Electromagnetic Noise

In the electric vehicle (EV), electromagnetic noise is generated due to the on/off operation of an inverter for the control of current supplied to the electric motor, or the induced voltage of the electric motor itself, and the like. The electromagnetic noise is transmitted to the drive shaft 11, for example, and is radiated with the drive shaft 11 as an antenna. The electromagnetic noise radiated in this way may cause communication failures in an in-vehicle radio and an in-vehicle wireless device, and may cause malfunctions in various electronic apparatuses.

In the sealing device 101 according to the present embodiment, the sealing body 121 formed of conductive rubber serves as the conducting circuit 151 and allows the electromagnetic noise transmitted to the drive shaft 11 to flow into the housing 12. This can prevent the communication failures and malfunctions.

The grease G is filled between the sealing surface 133 of the conductive lip 131 and the drive shaft 11. Therefore, a film of the grease G is interposed between the sealing surface 133 and the drive shaft 11, the grease G having conductivity bears a part in the conducting circuit 151. Therefore, the sealing surface 133 of the conductive lip 131 contacts the drive shaft 11 via the grease G having conductivity and reliably releases the electromagnetic noise transmitted to the drive shaft 11 to the housing 12.

(2) Lubricating Function

The lip portion 143 of the sealing lip 141 is lubricated by fluid such as lubricating oil stored on the interior side I. On the other hand, the sealing surface 133 of the conductive lip 131 cannot be expected to be lubricated by the fluid on the interior side I. Therefore, in the sealing device 101 according to the present embodiment, the grease groove 134 is provided in the sealing surface 133 to hold the grease G. When the drive shaft 11 rotates, the grease G in the grease groove 134 is filled between the sealing surface 133 and the drive shaft 11. This makes it possible to lubricate the sealing surface 133 with the grease G and protect it from wear and damage.

Further, the sealing surface 133 can be reliably lubricated and protected by the grease G despite adopting the sealing structure which increases frictional resistance called surface contact.

(3) Negative Pressure Preventing Function

When the drive shaft 11 rotates, the thread groove 146 provided in the sealing lip 141 returns the fluid leaked from the interior side I to the atmospheric surface 145 beyond the lip portion 143 to the interior side I by the screw pumping action. On the other hand, the screw pumping action attempts to make the space S between the conductive lip 131 and the sealing lip 141 negative pressure. Assuming that the space S becomes negative pressure, the conductive lip 131 and the sealing lip 141 are attracted to the drive shaft 11, thereby increasing an adhesive force to the drive shaft 11. In this case, abnormal friction occurs in the lip portion 143 of the sealing lip 141, apart from the sealing surface 133 of the conductive lip 131 where the film of the grease G is formed between the sealing surface 133 and the drive shaft 11.

In the present embodiment, when the screw pumping action by the thread groove 146 occurs, air on the atmosphere side O is introduced into the space S through each connecting groove 135 provided in the sealing surface 133 of the conductive lip 131. Consequently, the space S does not reach negative pressure, thereby making it possible to prevent abnormal friction of the sealing lip 141, which will be caused when the space S becomes negative pressure.

3. Another Embodiment of Fluid Return Portion

Another embodiment of the fluid return portion (thread groove 146) will be described with reference to FIG. 5.

In the embodiment described above, there has been illustrated the configuration in which the plurality of threads of thread grooves 146 are provided in the atmospheric surface 145 as the fluid return portion which returns the fluid leaked from the interior side I to the atmospheric surface 145 to the interior side I by the screw pumping action. On the other hand, the fluid return portion is not limited to the thread groove 146, but can also be realized by a thread protrusion 147.

Figure 5:
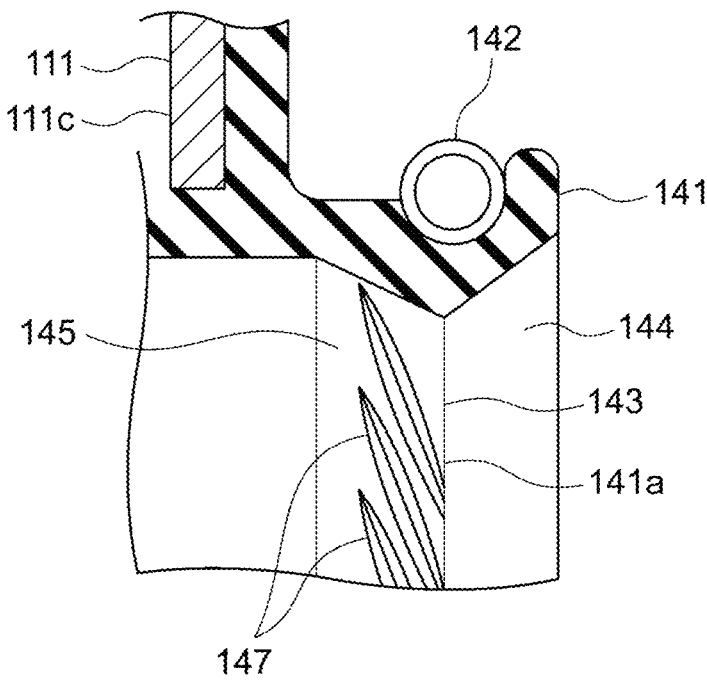
FIG. 5 is a side view of a sealing lip showing another form (thread protrusion) of a fluid return portion.

As illustrated in FIG. 5, in the present embodiment, the plurality of threads of thread protrusions 147 are provided on the atmospheric surface 145 of the sealing lip 141. These thread protrusions 147 are protrusions which are inclined along the rotational direction of the drive shaft 11 with the lip portion 143 as a starting point. Such thread protrusions 147 generate an airflow from the atmosphere side O toward the interior side I as the drive shaft 11 rotates, and cause a screw pumping action to push back the fluid (not illustrated) leaked to the atmosphere side O beyond the lip portion 143 to the interior side I.

Second Embodiment

Figure 6:
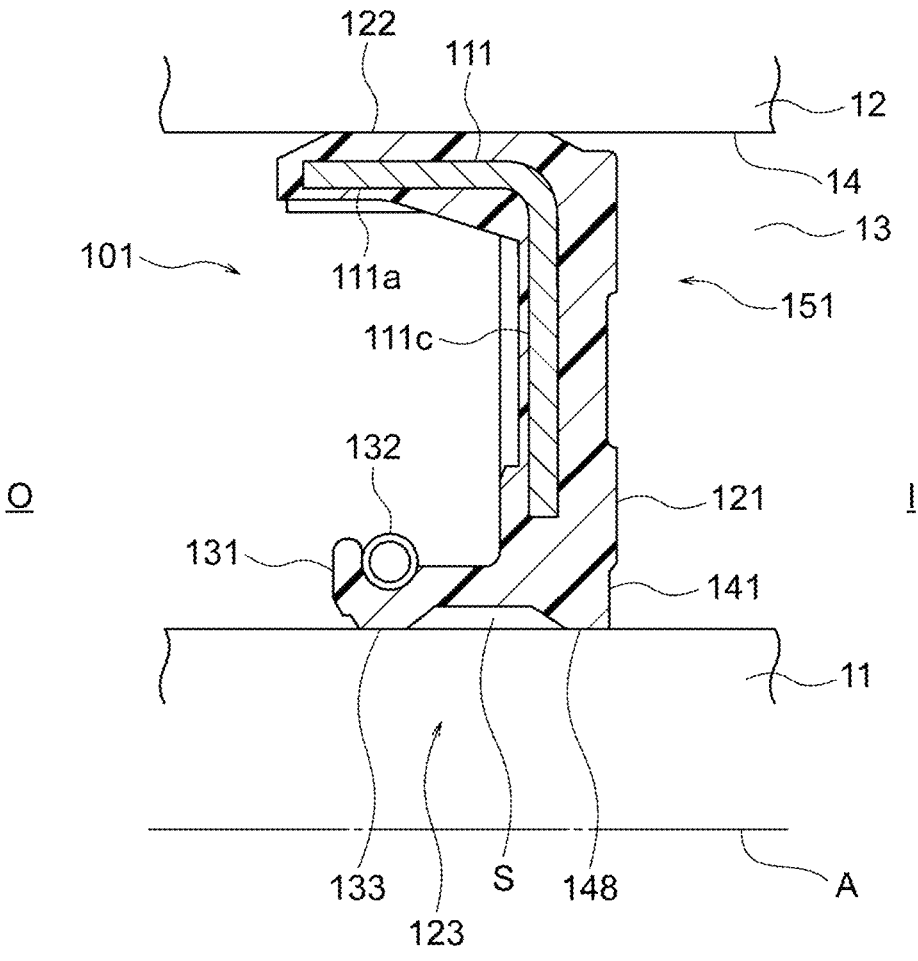
FIG. 6 is a cross-sectional view of a sealing device according to a second embodiment, which is arranged between two members.
Figure 7:
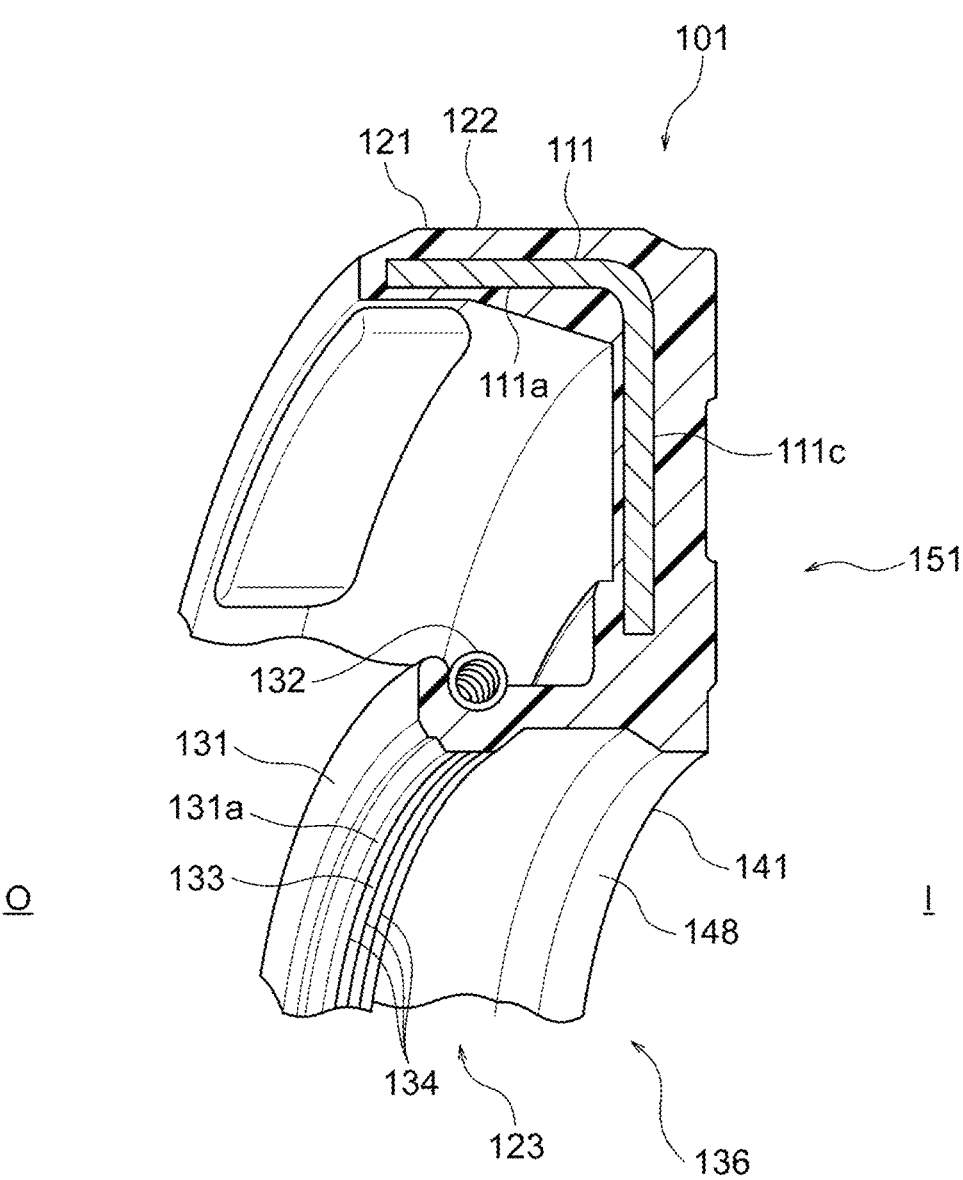
FIG. 7 is a perspective view of the sealing device whose part is partially illustrated in cross section.

A second embodiment will be described with reference to FIGS. 6 and 7. Components which are the same as those in the first embodiment are indicated by the same reference numerals, and description thereof will also be omitted.

1. Configuration

In the present embodiment, a reinforcing ring 111 has an L-shaped cross section. A support piece 111*c* is bent at right angles from a fixed piece 111*a*, and the bent piece 111*b* (refer to FIGS. 1 and 2) is not provided.

Due to the shape of such a reinforcing ring 111, a sealing portion 123 does not branch into a T-shaped form from the support piece 111*c* as in the first embodiment (refer to FIGS. 1 and 2). In the sealing portion 123, only a portion forming a conductive lip 131 is bent into an L-shape. As a result, a sealing lip 141 is provided at a position near the end of the support piece 111*c*.

The sealing lip 141 in the present embodiment brings a planar sealing surface 148 into contact with a drive shaft 11 in the same manner as the conductive lip 131. However, unlike a sealing surface 133 of the conductive lip 131, the sealing surface 148 of the sealing lip 141 is provided with neither a grease groove 134 nor a connecting groove 135.

Also, unlike the sealing lip 141 in the first embodiment as well, the sealing lip 141 in the present embodiment is not provided with neither the thread groove 146 nor the thread protrusion 147. That is, the sealing lip 141 is not provided with a fluid return portion which exerts a screw pumping action. For this reason, since a space S generated between the conductive lip 131 and the sealing lip 141 does not become negative pressure, the sealing surface 133 of the conductive lip 131 is not provided with the connecting groove 135 either.

2. Actions and Effects

In such a configuration, the sealing portion 123 of the sealing device 101 brings the conductive lip 131 and the sealing lip 141 into contact with the drive shaft 11 to prevent leakage of fluid (object to be sealed) from the interior side I. The sealing lip 141 performs a main sealing function of preventing the leakage of the fluid from the interior side I by the sealing surface 148. The conductive lip 131 performs a secondary sealing function of damming the fluid leaked from the sealing lip 141 by the sealing surface 133. The conductive lip 131 also functions as a dust lip which suppresses the intrusion of sludges and foreign matters from the atmosphere side O to the interior side I.

A countermeasure against electromagnetic noise and a lubricating function are the same as in the first embodiment.

Third Embodiment

A third embodiment will be described with reference to FIG. 8. Components which are the same as those in the first embodiment are indicated by the same reference numerals, and description thereof will also be omitted.

1. Configuration

A sealing device 101 according to the present embodiment is used in a drive system of an electric vehicle (EV), for example, a differential device. Therefore, one of two relatively displaceable members is a differential case (not illustrated), and the other thereof is an axle (not illustrated). The sealing device 101 is fixedly attached to the differential case by fitting an outer peripheral seal 122 reinforced to a fixed piece 111*a* of a reinforcing ring 111 into a shaft hole (not illustrated) of the differential case.

The present embodiment differs greatly from the first embodiment in that the sealing lip 141 is not provided, the conductive lip 131 replaces the sealing lip 141, and dust lips 161 and a side lip 171 are provided.

Similar to the first embodiment, the reinforcing ring 111 has the fixed piece 111*a*, a bent piece 111*b*, and a support piece 111*c*. However, the bent piece 111*b* is bent at right angles from the fixes piece 111*a* and is passed to the support piece 111*c* without being bent in the middle. The support piece 111*c* is bent at an angle of about 80 degrees from the bent piece 111*b* in a direction facing the fixed piece 111*a*, and further has an end bent in a direction perpendicular to the axial direction.

A sealing body 121 provided so as to cover the front and back surfaces of the reinforcing ring 111 further extends obliquely from the support piece 111*c* and is formed with the conductive lip 131 at its tip. The conductive lip 131 has basically the same configuration as the first embodiment. The difference from the first embodiment is that there is only one grease groove 134, and no connecting groove 135 is provided.

The conductive lip 131 is arranged at a position to partition the interior side I and the atmosphere side O, and is in contact with fluid on the interior side I.

The sealing body 121 which covers the support piece 111*c* included in the reinforcing ring 111 is formed by integrally molding the two dust lips 161 and one side lip 171. The two dust lips 161 are inclined toward the atmosphere side O. The side lip 171 extends further toward the atmosphere side O than the dust lips 161 and is inclined radially outward.

2. Actions and Effects

In such a configuration, a sealing portion 123 of the sealing device 101 brings the conductive lip 131 into contact with the unillustrated axle to prevent leakage of the fluid (object to be sealed) from the interior side I. The dust lips 161 and the side lip 171 suppress the intrusion of sludges and foreign matters from the atmosphere side O to the interior side I.

A countermeasure against electromagnetic noise and a lubricating function are the same as in the first embodiment.

Description of Reference Numerals

11 drive shaft (another member)
12 housing (one member)
13 gap
14 shaft hole
101 sealing device
111 reinforcing ring
111*a* fixed piece
111*b* bent piece
111*c* support piece
121 sealing body
122 outer peripheral seal
123 sealing portion
131 conductive lip
131*a* tip
132 garter spring
133 sealing surface
134 grease groove
135 connecting groove
136 grease supply portion
141 sealing lip

141*a* tip
142 garter spring
143 lip portion
144 interior surface
145 atmospheric surface
146 thread groove (fluid return portion)
147 thread protrusion (fluid return portion)
148 sealing surface
151 conducting circuit
161 dust lip
171 side lip
A axis
G grease
I interior side
O atmosphere side
S space

The invention claimed is:

1. A sealing device, comprising: a sealing body made of conductive rubber, which is fixed in a state of contact with one of two relatively displaceable members containing an object to be sealed and integrally has an annular conductive lip having a tip brought into contact with the other of the two members to seal the object; a sealing surface provided at the tip of the conductive lip to be brought into surface contact with the other member; grease having conductivity, which is filled between the sealing surface and the other member;

grease grooves provided in the sealing surface to retain the grease;

a connecting groove that connects the grease grooves; and wherein the grease grooves and the connecting groove are formed in the sealing surface of the conductive lip.

2. A sealing device, comprising: a sealing body made of conductive rubber, which is fixed in a state of contact with one of two relatively displaceable members containing an object to be sealed and integrally has an annular conductive lip having a tip brought into contact with the other of the two members to seal the object;

a sealing surface provided at the tip of the conductive lip to be brought into surface contact with the other member;

grease grooves provided in the sealing surface and retaining grease having conductivity in advance so that the grease is capable of being filled between the sealing surface and the other member;

a connecting groove that connects the grease grooves; and wherein the grease grooves and the connecting groove are formed in the sealing surface of the conductive lip.

3. A sealing device, comprising: a sealing body made of conductive rubber, which is fixed in a state of contact with one of two relatively displaceable members containing an object to be sealed and integrally has an annular conductive lip having a tip brought into contact with the other of the two members to seal the object; a sealing surface provided at the tip of the conductive lip to be brought into surface contact with the other member;

a grease supply portion configured to retain grease having conductivity in advance in grease grooves provided in the sealing surface and to fill the grease between the sealing surface and the other member;

a connecting groove that connects the grease grooves; and wherein the grease grooves and the connecting groove are formed in the sealing surface of the conductive lip.

4. The sealing device according to claim 1, wherein the conductive lip has the sealing surface at the tip.

5. The sealing device according to claim 4, wherein the grease grooves are provided along a circumferential direction of the sealing surface.

6. The sealing device according to claim 1, wherein the sealing body integrally has an annular sealing lip which contacts and seals the other member on an interior side from the conductive lip.

7. The sealing device according to claim 6, including a fluid return portion which returns fluid leaked from the interior side to a surface on the atmosphere side of the sealing lip to the interior side by a screw pumping action, wherein the connecting groove connects a space on the sealing lip side and a space on the atmosphere side.

8. The sealing device according to claim 7, wherein the fluid return portion is a thread groove provided in the surface on the atmosphere side of the sealing lip.

9. The sealing device according to claim 7, wherein the fluid return portion is a thread protrusion provided on the surface on the atmosphere side of the sealing lip.

10. The sealing device according to claim 1, wherein the sealing body integrally has an annular dust lip closer to the atmosphere side than the conductive lip.

11. The sealing device according to claim 2, wherein the conductive lip has the sealing surface at the tip.

12. The sealing device according to claim 11, wherein the grease grooves are provided along a circumferential direction of the sealing surface.

13. The sealing device according to claim 3, wherein the conductive lip has the sealing surface at the tip.

14. The sealing device according to claim 13, wherein the grease grooves are provided along a circumferential direction of the sealing surface.

15. The sealing device according to claim 2, wherein the sealing body integrally has an annular sealing lip which contacts and seals the other member on an interior side from the conductive lip.

16. The sealing device according to claim 15, including a fluid return portion which returns fluid leaked from the interior side to a surface on the atmosphere side of the sealing lip to the interior side by a screw pumping action, wherein the connecting groove connects a space on the sealing lip side and a space on the atmosphere side.

17. The sealing device according to claim 3, wherein the sealing body integrally has an annular sealing lip which contacts and seals the other member on an interior side from the conductive lip.

18. The sealing device according to claim 17, including a fluid return portion which returns fluid leaked from the interior side to a surface on the atmosphere side of the sealing lip to the interior side by a screw pumping action, wherein the connecting groove connects a space on the sealing lip side and a space on the atmosphere side.

19. The sealing device according to claim 2, wherein the sealing body integrally has an annular dust lip closer to the atmosphere side than the conductive lip.

20. The sealing device according to claim 3, wherein the sealing body integrally has an annular dust lip closer to the atmosphere side than the conductive lip.

* * * * *